US011835635B2

(12) United States Patent
Tzirimis

(10) Patent No.: US 11,835,635 B2
(45) Date of Patent: Dec. 5, 2023

(54) SYSTEM FOR SELECTING THE TRACKING TECHNIQUE FOR TRACKING A USER DEVICE BASED ON USER DEVICE PROXIMITY TO LOCATION BEACONS

(71) Applicant: Intrex, Reston, VA (US)

(72) Inventor: Ted Tzirimis, Reston, VA (US)

(73) Assignee: INTREX, Reston, VA (US)

(*) Notice: Subject to any disclaimer, the term of this patent is extended or adjusted under 35 U.S.C. 154(b) by 93 days.

(21) Appl. No.: 17/511,941

(22) Filed: Oct. 27, 2021

(65) Prior Publication Data
US 2022/0128710 A1 Apr. 28, 2022

Related U.S. Application Data

(60) Provisional application No. 63/106,230, filed on Oct. 27, 2020.

(51) Int. Cl.
G01S 19/48 (2010.01)
G01S 19/46 (2010.01)
G01S 19/45 (2010.01)

(52) U.S. Cl.
CPC .............. G01S 19/48 (2013.01); G01S 19/46 (2013.01); G01S 19/45 (2013.01)

(58) Field of Classification Search
CPC ........... G01S 19/48; G01S 19/45; G01S 19/46
USPC ........................ 342/357.31, 357.28, 357.29
See application file for complete search history.

(56) References Cited

U.S. PATENT DOCUMENTS

| | | | | |
|---|---|---|---|---|
| 7,149,533 B2* | 12/2006 | Laird | ................... | A61B 5/1112 455/418 |
| 7,221,928 B2* | 5/2007 | Laird | ................... | A61B 5/411 340/539.18 |
| 8,633,853 B2* | 1/2014 | Amidi | ................... | G01S 19/48 342/357.49 |
| 10,151,844 B1* | 12/2018 | Pahlavan | ................ | G01S 19/48 |
| 10,397,751 B2* | 8/2019 | Shapiro | ................. | H04M 7/006 |
| 10,419,890 B2* | 9/2019 | Edge | .................... | H04W 4/029 |
| 11,452,032 B2* | 9/2022 | Gupta | .................. | H04W 4/029 |
| 2008/0252518 A1* | 10/2008 | Yeshayahu | .............. | G01S 19/48 342/357.31 |

(Continued)

FOREIGN PATENT DOCUMENTS

CN 109597110 B * 6/2021 ............. G01S 19/48

Primary Examiner — Chuong P Nguyen
(74) Attorney, Agent, or Firm — MH2 TECHNOLOGY LAW GROUP LLP

(57) ABSTRACT

A computer-implemented method includes: selecting between a first location tracking technique and a second location tracking technique used to track a user device. The selecting includes: receiving a communications signal emitted from the user device via one or more network devices; selecting the first tracking location technique based on receiving the communications signal; determining that the user device is outside communications range of the one or more network devices; and selecting the second tracking location technique based on the determining that the user device is outside communications range of the one or more network devices. The method further includes monitoring location information of the user device based on the selecting between the first location tracking technique and the second location tracking technique; and storing or outputting the location information.

20 Claims, 3 Drawing Sheets

(56) References Cited

U.S. PATENT DOCUMENTS

| | | | |
|---|---|---|---|
| 2011/0201347 A1* | 8/2011 | Abraham | H04W 36/30 |
| | | | 455/456.1 |
| 2014/0171099 A1* | 6/2014 | Sydir | H04W 4/021 |
| | | | 455/456.1 |
| 2016/0227378 A1* | 8/2016 | Dominguez Romero | |
| | | | G01S 19/46 |
| 2021/0400440 A1* | 12/2021 | Tzirimis | H04W 4/029 |

* cited by examiner

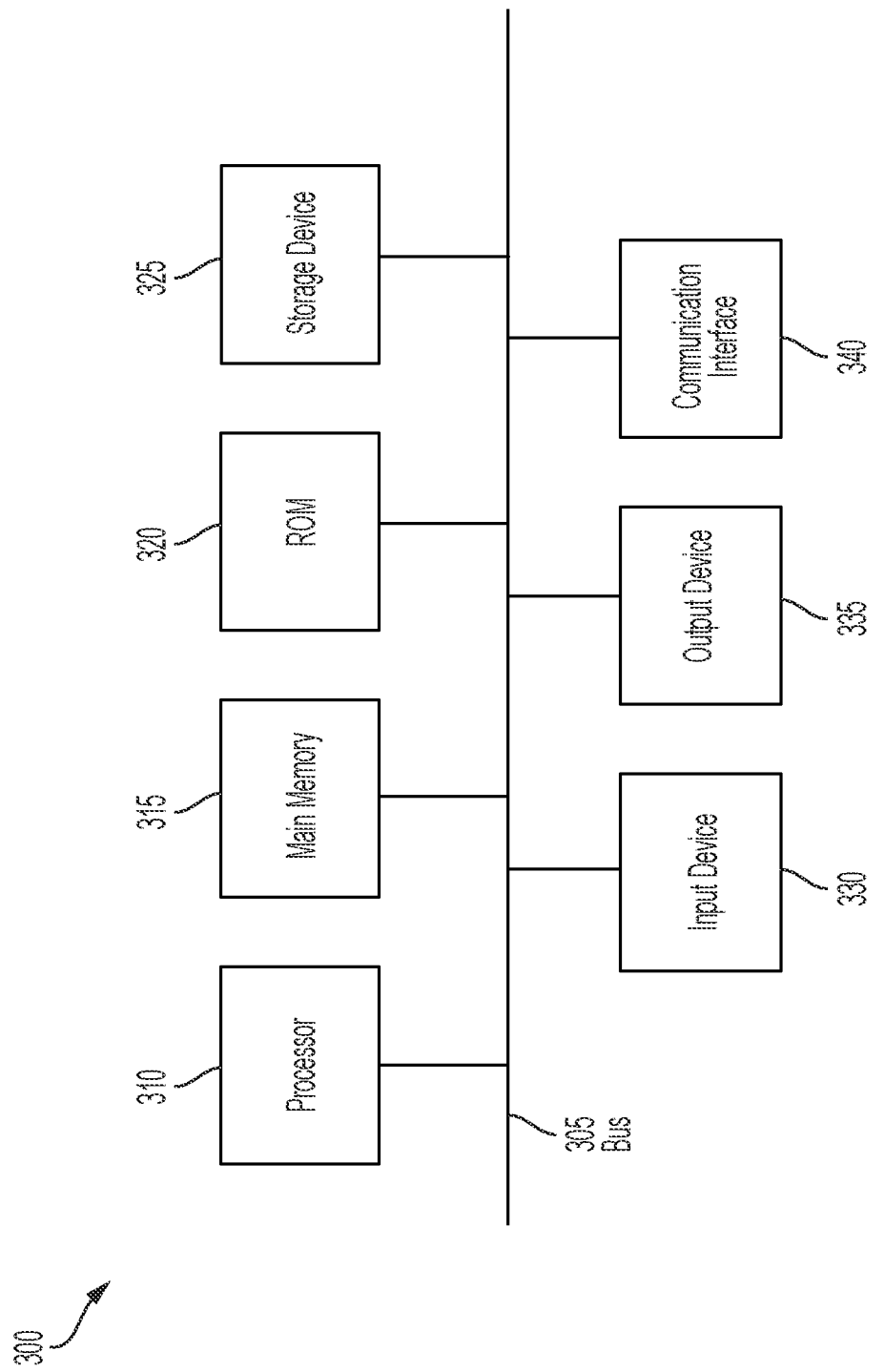

SYSTEM FOR SELECTING THE TRACKING TECHNIQUE FOR TRACKING A USER DEVICE BASED ON USER DEVICE PROXIMITY TO LOCATION BEACONS

CROSS-REFERENCE TO RELATED APPLICATIONS

This application claims priority to U.S. Provisional Patent Application Ser. No. 63/106,230 filed Oct. 27, 2020, the disclosure of which is incorporated herein by reference in its entirety.

BACKGROUND

A user device may include a computing device capable of communicating via a network. For example, a user device may include to a mobile communication device (e.g., a smart phone or a personal digital assistant (PDA)), a portable computer device (e.g., a laptop or a tablet computer), a wearable device (e.g., a smart watch, fitness band, smart eyewear, smart clothing, etc.).

A Global Position System (GPS) is a satellite-based radio-navigation that provides geolocation and time information to a GPS receiver anywhere on or near the Earth where there is an unobstructed line of sight to four or more GPS satellites. GPS location accuracy may be based on the strength of the GPS signal received by a receiver. Obstacles such as mountains and buildings block or diminish the strength of GPS signals, thus reducing location accuracy.

Internet of Things (IoT) is a system of interrelated computing devices (e.g., user devices, as described herein), mechanical and digital machines provided with unique identifiers (UIDs) and the ability to transfer data over a network without requiring human-to-human or human-to-computer interaction. Any variety of IoT devices may be connected to form a smart network in a facility, home, etc.

SUMMARY

In one example aspect, a computer-implemented method includes: selecting between a first location tracking technique and a second location tracking technique used to track a user device. The selecting includes: receiving a communications signal emitted from the user device via one or more network devices; selecting the first tracking location technique based on receiving the communications signal; determining that the user device is outside communications range of the one or more network devices; and selecting the second tracking location technique based on the determining that the user device is outside communications range of the one or more network devices. The method further includes monitoring location information of the user device based on the selecting between the first location tracking technique and the second location tracking technique; and storing or outputting the location information.

In another aspect, the computer-implemented method can be embodied in a non-transitory computer program product and executed on a computer system.

BRIEF DESCRIPTION OF THE DRAWINGS

FIG. 3 illustrates example components of a device that may be used within environment of FIG. 1

DETAILED DESCRIPTION

Figure 1:
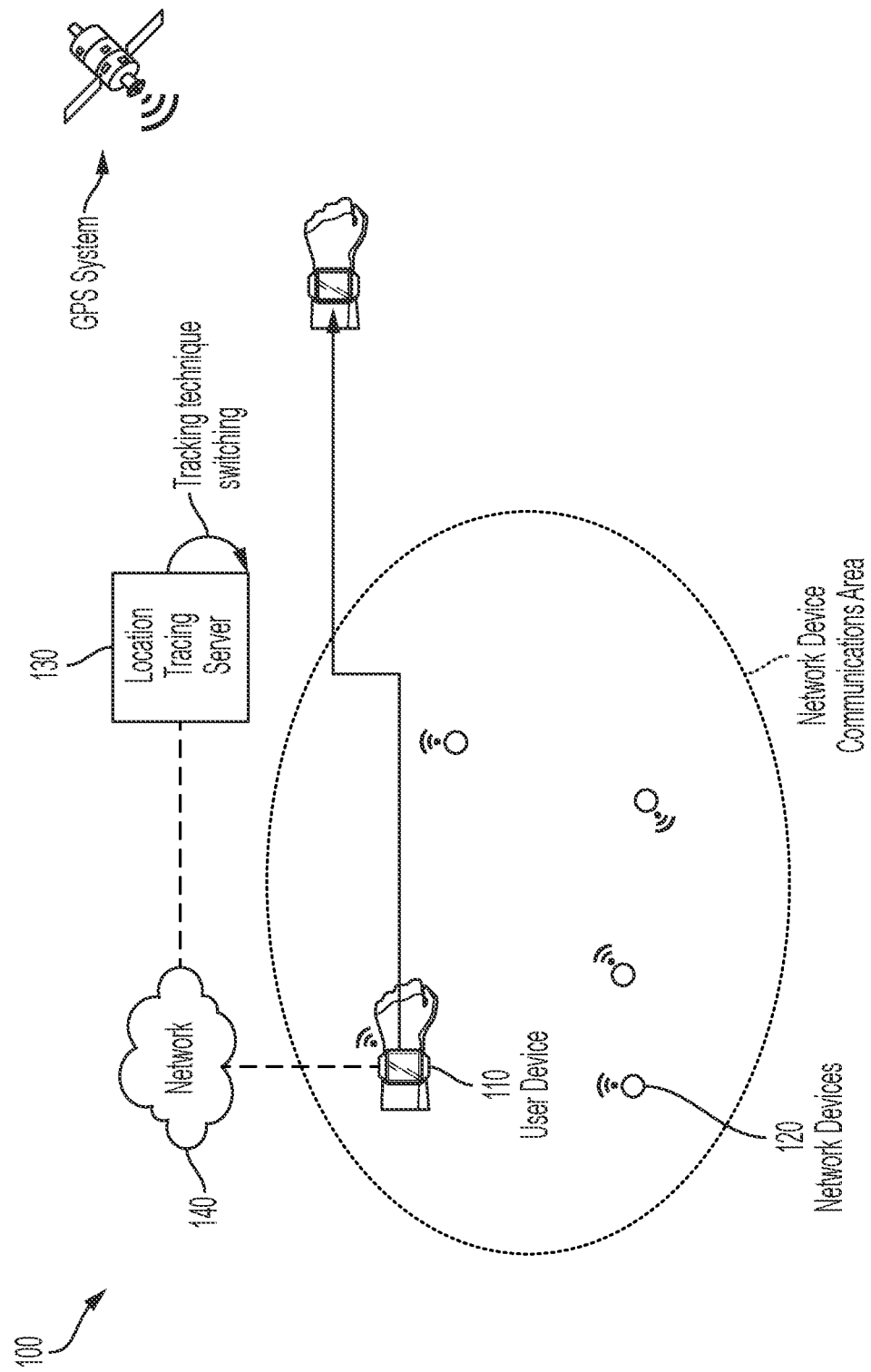
FIG. 1 illustrates an overview of an example implementation and environment as described herein.

Aspects of the present disclosure, described herein, may include a system and/or method that logs a rich set of data including the precise locations of user devices at various times. More specifically, the systems and/or methods, described herein, may log the precise locations of user devices using a location tracing system having multiple distributed network devices at known locations (e.g., location beacons located at fixed locations in or around a facility, such as a nursing home facility or other type of facility). For example, the location of a user device may be determined based on a communication signal strength of passive communication signals received by one or more known-location network devices (e.g., location beacons) and emitted by the user device. More specifically, the distance between the user device and the one or more network devices may be determined based on a communication signal strength received by one or more known-location network devices and emitted by the user device.

In some embodiments, the communication signals emitted by the user device and received by the one or more network devices may include one or more of any variety of network communication signals, such as BLUETOOTH, BLUETOOTH Low Energy (BLE), Near Field Communication (NFC), Z-Wave, ZigBee, Radio Frequency (RF) signals, WiFi, or the like. Thus, as the user device moves (e.g., as a user wearing or carrying the user device moves), the signals emitted by the user device may be received by different network devices with different levels of strength. By using signal strength information, the precise distance between the user device and the network device may be determined (e.g., to within a few feet). Thus, as the location of the network device is known, the precise location of the user device may be determined based on its proximity to (e.g., distance from) the network device.

In one specific illustrative example, the user device may be a wearable device (e.g., smart watch, smart pendant, etc.), and the network devices may be interconnected in or around a facility (e.g., a nursing home). In this example, a user may be wearing the user device and as the user moves throughout the facility, the user's precise location may be tracked as the different network devices receive the passive communication signals emitted by the user device. Data records identifying the users precise location at configurable regular time intervals (e.g., each second, every few seconds, every few minutes, etc.) may be generated and stored, and later used to generate any variety of reports, graphical displays of the user's location, on a map or layout, etc.

Each network device that receives a communication signal from a user device may provide a data object to a location tracing server in which each data object includes an identifier of the user device (which may also correspond to an identifier of a user), an identifier of the network device (e.g., indicating the location of the network device), a signal strength of the received communication signal, and/or a timestamp. The network device may continue to provide data objects at any interval (e.g., every second, every few seconds, every minute, etc.). In this way, the location tracing server may store and log a rich set of location information identifying the precise location of user devices (and hence, the users) at specific times. This rich set of location information may be used to generate any variety of reports or graphical representations of the user's location at different times, the user's proximity to other individuals (e.g., individuals that may have been exposed to an infection), generate alerts when a user exists a defined boundary (e.g., a quarantine boundary, a safe-zone boundary), etc.

In addition to tracking a user device when the user device is within communications range of the network devices, the location tracing server may track the user device after the user device has departed from communications range of the network devices. For example, the location tracing server may maintain information identifying the fixed locations of the network devices, and as described above, may determine the user device's proximity to the network devices. In this way, the location tracing server may determine that the user device has exited communications range of the network devices as the signal strength between the user device and one or more network devices progressively weakens. Once the network devices no longer receive a signal from the user device, the location tracing server may determine that the user device has exited the communications range (e.g., an area in which the network devices may receive signals emitted by the user device). Further, the location tracing server may continue tracking the user device, but may switch to using a global positioning system (GPS) to continue tracking the user device, rather than using the network device proximity information. That is, the location tracing server may intelligently switch between tracking the user device using different location tracking techniques (e.g., between network device proximity, and GPS). In this way, the user device location may be precisely tracked using a first tracking technique when the user device is within communications is within communications range of the network devices (e.g., when the user device is in or near a facility having the network devices installed throughout the facility), and the user device may continue to be tracked using a second or different tracking technique (e.g., GPS) when the user device exists communication range of the network devices.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 illustrates an example environment in accordance with aspects of the present disclosure. As shown in FIG. 1, environment 100 includes a user device 110, one or more network devices 120, contact tracing server 130, and a network 140. In some embodiments, the user device 110, and/or the network device 120 may be Internet-of-Things (IoT) devices and/or perform one or more functions of IoT devices.

The user device 110 may include a computing device capable of communicating via a network, such as the network 140. In example embodiments, the user device 110 corresponds to a mobile communication device (e.g., a smart phone or a personal digital assistant (PDA)), a portable computer device (e.g., a laptop or a tablet computer), a wearable computing device, and/or another type of computing device. In some embodiments, the user device 110 may emit passive communications signals (e.g., BLUETOOTH, BLE, NFC, ZigBee, Z-Wave, WiFi, RF, etc.) which may be received by one or more network devices 120. In some embodiments, the user device 110 may include a software component that links information regarding the user device 110 to the contact tracing server 130 (with the expressed permission of the user). For example, the linked information may include user information, user medical information, user proximity restrictions, user preferences, etc. In some embodiments, the linked information may be provided on an opt-in basis in which the user provides expressed permission to share the linked information. Further, the user may select to opt-out at any time to have their information unlinked from the contact tracing server 130.

The network device 120 may include one or more network communication devices or location beacons that may form an interconnected "mesh" network. In some embodiments, multiple network devices 120 may be distributed across a facility (e.g., a nursing home facility or other type of facility). In some embodiments, the network devices 120 may be fixed or have known locations. The network device 120 may be an IoT device, such as a beacon, a smart device, a sensor, or the like. In one embodiment, the network device 120 may be a smart soap/sanitizing agent dispenser equipped with sensors for detecting soap/sanitizing agent levels and/or soap/sanitizing agent usage by a user (e.g., in which the user is identified by a connection between the user's user device 110). The soap/sanitizing agent usage may be used to track and/or implement infection control measures by users. The soap/sanitizing agent usage by user may also be stored along with location information by the location tracing server 130.

In some embodiments, a network device 120 may receive passive communication signals from the user device 110. Based on receiving a passive communication signal, the network device 120 may provide, to the contact tracing server 130, a location data object to the contact tracing server 130 that identifies an identifier of the user device 110 from which the communication signal was received (e.g., a MAC address and/or other identifier), an identifier of the network device 120, and a timestamp.

The contact tracing server 130 may include one or more computing systems that receives location data objects from the network devices 120. Based on a receiving a location data object, the contact tracing server 130 may generate and log a location data record that maps the MAC address to an identifier of a user device 110 and a corresponding user. Further, the data record may identify the location of the network device 120 associated with the location data object, and the communication signal strength indicating a distance of the user device 110 to the network device 120. In this way, a location data record may identify the user device 110 (and a user, if registered). In some embodiments, the contact tracing server 130 may receive a location data object from a user device 110 indicating the location of the user device 110 (e.g., from a GPS device of the user device 110). Further, as described herein, the contact tracing server 130 may switch the tracking technique from a first tracking technique (e.g., proximity of the user device 110 to the network devices 120) to a second tracking technique (e.g., using GPS to track the user device 110).

The network 140 may include network nodes and one or more wired and/or wireless networks. For example, the network 140 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 140 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 140 may include copper transmission cables, optical transmission fibers, wireless transmission, routers, firewalls, switches, gateway computers and/or edge servers.

The quantity of devices and/or networks in the environment 100 is not limited to what is shown in FIG. 1. In practice, the environment 100 may include additional devices and/or networks; fewer devices and/or networks; different devices and/or networks; or differently arranged devices and/or networks than illustrated in FIG. 1. Also, in some implementations, one or more of the devices of the environment 100 may perform one or more functions described as being performed by another one or more of the devices of the environment 100. Devices of the environment 100 may interconnect via wired connections, wireless connections, or a combination of wired and wireless connections.

As shown in FIG. 1, the user device 110 may be located within a network device communications area (e.g., an area in which the network devices 120 collectively may receive signals emitted by the user device 110). In the example shown, the user device 110 may be located in or near a facility. While the user device 110 is located within the network device communications area, the location tracing server 130 may track the user device 110 based on its proximity to the network devices 120. Once the user device 110 exists the network device communications area, the location tracing server 130 may switch the technique used to track the user device 110. More specifically the location tracing server 130 may begin tracking the user device 110 using a GPS system rather than by using the network devices 120. As described herein, the location tracing server 130 may detect that the user device 110 has exited the network device communications area as the signal strength between the user device 110 and one or more network devices 120 progressively weakens. Once the network devices 120 no longer receive a signal from the user device 110, the location tracing server 130 may determine that the user device 110 has exited the communications range and switch to track the user device 110 via GPS.

In summary, the location tracing server 130 may select or switch the location tracking technique used to track the user device 110 between using the network devices 120 to track location, and GPS to track location. The technique used to track the user device 110 may be based on whether the network devices 120 receive location tracking signals from the user device 110 (e.g., indicating that the user device 110 is within communications range of the network devices 120). The location tracing server 130 may track and/or monitor the location information of the user device 110 using the selected location tracking technique as the user enters and exists communication range of the network devices 120. In some embodiments, the location tracing server 130 may store and/or output the location information of the user device 110.

Figure 2:
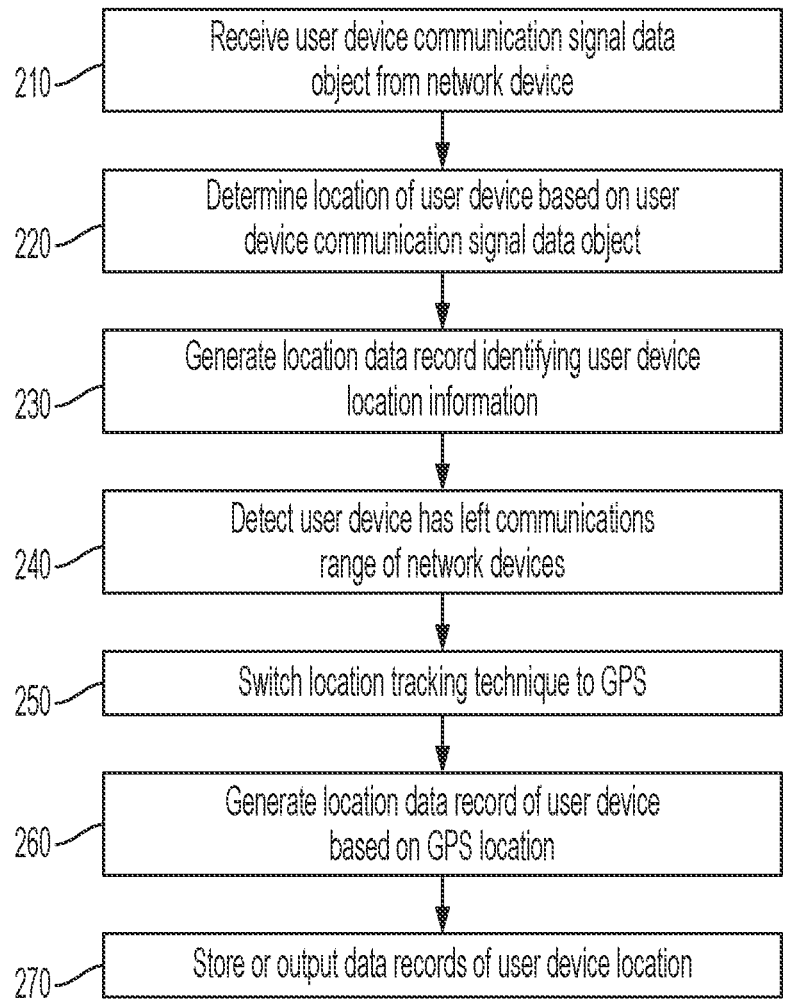
FIG. 2 illustrates an example flowchart of a process for monitoring the location of a user device by intelligently switching the tracking technique used to monitor the location of the user device in accordance with aspects of the present disclosure.

FIG. 2 illustrates an example flowchart of a process for selecting the location tracking technique used to track a user device in accordance with aspects of the present disclosure. The blocks of FIG. 2 may be implemented in the environment of FIG. 2, for example, and are described using reference numbers of elements depicted in FIG. 1. As noted herein, the flowchart illustrates the architecture, functionality, and operation of possible implementations of systems, methods, and computer program products according to various embodiments of the present disclosure. In some embodiments, the user device 110 may register with the location tracing server 130 in which a user of the user device 110 may provide user input to allow tracking permissions to permit the location tracing server 130 to track the user device 110 via the network devices 120 and/or GPS.

As shown in FIG. 2, The process 200 may include receiving user device communication signal data object (block 210). For example, the location tracing server 130 may receive a user device communication signal data object associated with a user device 110 from a network device 120. In some embodiments, the user device communication signal data object may identify the network device 120, the user device 110, and a measure of the strength of the communication signal received by the network device 120 and emitted by the user device 110.

The process 200 also may include determining a location of the user device based on the user device communication signal data object (block 220). For example, the location tracing server 130 may determine the location of the user device 110 based on the measure of the strength of the communication signal received by the network device 120 and emitted by the user device 110 (e.g., as identified in the user device communication signal data object). In some embodiments, the location tracing server 130 may determine a radius of the location of the user device 110 based on the received signal strength and the known location of the network device 120 (e.g., based on the identifier of the network device 120 included in the user device communication signal data object). For example, lower signal strengths may indicate that the distance between the user device 110 and the location tracing server 130 are higher. In some embodiments, the location tracing server 130 may combine signal strength data from multiple different network devices 120 to determine a more precise location of the user device 110.

The process 200 further may include generating a location data record identifying the user device location information (block 230). For example, the location tracing server 130 may generate a location data record identifying the location information for the user device 110. In some embodiments, the location data record may identify the user device 110, a user registered to the user device 110, and/or a radius of location of the user device 110 (e.g., as determined at block 220), etc.

The process 200 may also include detecting that the user device has left communications range of the network devices (block 240). For example, the location tracing server 130 may detect that the user device has left the communications range of the network devices 120. As described above with respect to FIG. 1, while the user device 110 is located within the network device communications area, the location tracing server 130 may track the user device 110 based on its proximity to the network devices 120. In this way, the location tracing server 130 may detect that the user device 110 has exited the network device communications area as the signal strength between the user device 110 and one or more network devices 120 progressively weakens. Once the network devices 120 no longer receive a signal from the user device 110, the location tracing server 130 may determine that the user device 110 has exited the communications range.

The process 200 may further include switching location tracking technique to GPS (block 250). For example, the location tracing server 130 may switch the location tracking technique used to track the user device 110 between using the network devices 120 to track location, and GPS to track location. In some embodiments, the location tracing server 130 may request the location of the user device 110 in which the user device 110 may obtain its location information via GPS and provide the location information to the location tracing server 130.

The process 200 may also include generating a location data record of the user device based on the GPS location (block 260). For example, the location tracing server 130 may generate a location data record identifying the location information for the user device 110 as determined by the GPS implemented on the user device 110. In some embodiments, the location data record may identify the user device 110, a user registered to the user device 110, and/or a radius of location of the user device 110 (e.g., as determined based on GPS).

The process 200 further may include storing or outputting data records of the user device location (block 270). For example, the location tracing server 130 may store or output data records of user device location (e.g., the data records identifying the location of the user device 110 as determined using the signal strengths received by the network devices 120 and/or via GPS). In some embodiments, the location tracing server 130 may output or present the data records in the form of a chart, data structure, and/or map (e.g., building floor layout). In some embodiments, the data records may be used to generate any variety of reports, such as reports indicating the location of a user at a given time, reports indicating other users with whom a target has been in contact, alerts for wander management indicating that a user has exited or is close to exiting a particular boundary, etc.

In some embodiments, the process 200 may be repeated (e.g., every second, few seconds, every minute, etc.). In this way, the location tracing server 130 may generate and store a rich set of data identifying the precise locations of user devices 110 whether the user device 110 is within communications range of the network device 120 or not. This rich set of data may be used to generate any variety of reports, alerts, etc., as described herein.

In summary, process 200 may select or switch the location tracking technique used to track the user device 110 between using the network devices 120 to track location, and GPS to track location. The technique used to track the user device 110 may be based on whether the network devices 120 receive location tracking signals from the user device 110 (e.g., indicating that the user device 110 is within communications range of the network devices 120). The location tracing server 130 may track and/or monitor the location information of the user device 110 using the selected location tracking technique as the user enters and exists communication range of the network devices 120.

FIG. 3 illustrates example components of a device 300 that may be used within environment 100 of FIG. 1. Device 300 may correspond to user device 110, the network device 120, and/or the contact tracing server 130. Each of user device 110, the network device 120, and/or the contact tracing server 130 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface. In embodiments, communication interface 340 may receiver computer readable program instructions from a network and may forward the computer readable program instructions for storage in a computer readable storage medium (e.g., storage device 325).

Device 300 may perform certain operations, as described in detail below. Device 300 may perform these operations in response to processor 310 executing software instructions contained in a computer-readable medium, such as main memory 315. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
   selecting, by a location tracing server, between a first location tracking technique and a second location tracking technique used to track a user device based on receiving a communications signal emitted from the user device via one or more network device;
   determining, by the location tracing server that the user device is outside communications range of the one or more network devices based on an analysis of a signal characteristic of the communication signal emitted from the user device;
   selecting, by the location tracing server, the second tracking location technique based on the determining that the user device is outside communications range of the one or more network devices;
   monitoring location information of the user device based on the selecting between the first location tracking technique and the second location tracking technique; and
   storing or outputting the location information.

2. The method of claim 1, wherein the first location tracking technique comprises locating the user device using the network devices, and the second location tracking technique comprises locating the user device using a Global Positioning System (GPS).

3. The method of claim 2, wherein the monitoring the location information of the user device based on the first location tracking technique comprises:
   receiving a communication signal data object comprising a measure of signal strength of a communication signal emitted by the user device and received by the one or more network devices and identifiers of the one or more network devices;
   determining a location of the registered used device based on known locations of the one or more network devices and the measure of the signal strength; and
   generating a location data record identifying the determined location of the used device.

4. The method of claim 1, further comprising:
   continuing to monitor the location of the user device using either the first location tracking location technique or the second location tracking technique; and
   switching between using first location tracking technique and the second location tracking technique to track the user device as the user device enters and exits communications range of the one or more network devices.

5. The method of claim 1, wherein the one or more network devices comprise location tracking beacons distributed at fixed locations.

6. The method of claim 1, wherein the storing or outputting the location information comprises at least one of:
   generating a report identifying locations of the user device at various times;
   generating a map of a facility or area identifying the locations of the user device;
   generating an alert; and
   generating a report identifying one or more second user devices with which the user device has come into proximity of a defined boundary.

7. The method of claim 1, wherein the communication signal is a passive communication signal comprising at least one of:
   a BLUETOOTH signal;
   a BLUETOOTH Low Energy (BLE) signal;
   a ZigBee signal;
   a Z-Wave Signal
   a WiFi signal;
   a Radio Frequency Signal; and
   a Near Field Communication (NFC) signal.

8. A computer program product comprising a computer readable storage medium having program instructions embodied therewith, the program instructions executable by a computing device to cause the computing device to perform a method comprising:
   selecting, by a location tracing server, between a first location tracking technique and a second location tracking technique used to track a user device based on receiving a communications signal emitted from the user device via one or more network device;
   determining, by the location tracing server that the user device is outside communications range of the one or more network devices based on an analysis of a signal characteristic of the communication signal emitted from the user device;
   selecting, by the location tracing server, the second tracking location technique based on the determining that the user device is outside communications range of the one or more network devices;
   monitoring location information of the user device based on the selecting between the first location tracking technique and the second location tracking technique; and
   storing or outputting the location information.

9. The computer program product of claim 8, wherein the first location tracking technique comprises locating the user device using the network devices, and the second location tracking technique comprises locating the user device using a Global Positioning System (GPS).

10. The computer program product of claim 9, wherein the monitoring the location information of the user device based on the first location tracking technique comprises:
    receiving a communication signal data object comprising a measure of signal strength of a communication signal emitted by the user device and received by the one or more network devices and identifiers of the one or more network devices;
    determining a location of the registered used device based on known locations of the one or more network devices and the measure of the signal strength; and
    generating a location data record identifying the determined location of the used device.

11. The computer program product of claim 8, wherein the method further comprising:
    continuing to monitor the location of the user device using either the first location tracking location technique or the second location tracking technique; and
    switching between using first location tracking technique and the second location tracking technique to track the user device as the user device enters and exits communications range of the one or more network devices.

12. The computer program product of claim 8, wherein the one or more network devices comprise location tracking beacons distributed at fixed locations.

13. The computer program product of claim 8, wherein the storing or outputting the location information comprises at least one of:
    generating a report identifying locations of the user device at various times;
    generating a map of a facility or area identifying the locations of the user device;

generating an alert; and generating a report identifying one or more second user devices with which the user device has come into proximity of a defined boundary.

14. The computer program product of claim 8, wherein the communication signal is a passive communication signal comprising at least one of:
a BLUETOOTH signal;
a BLUETOOTH Low Energy (BLE) signal;
a ZigBee signal;
a Z-Wave Signal
a WiFi signal;
a Radio Frequency Signal; and
a Near Field Communication (NFC) signal.

15. A system comprising:
a processor, a computer readable memory, a non-transitory computer readable storage medium associated with a computing device, and program instructions executable by the computing device to cause the computing device to perform a method comprising:
selecting, by a location tracing server, between a first location tracking technique and a second location tracking technique used to track a user device based on receiving a communications signal emitted from the user device via one or more network device;
determining, by the location tracing server that the user device is outside communications range of the one or more network devices based on an analysis of a signal characteristic of the communication signal emitted from the user device;
selecting, by the location tracing server, the second tracking location technique based on the determining that the user device is outside communications range of the one or more network devices;
monitoring location information of the user device based on the selecting between the first location tracking technique and the second location tracking technique; and
storing or outputting the location information.

16. The system of claim 15, wherein the first location tracking technique comprises locating the user device using the network devices, and the second location tracking technique comprises locating the user device using a Global Positioning System (GPS).

17. The system of claim 16, wherein the monitoring the location information of the user device based on the first location tracking technique comprises:
receiving a communication signal data object comprising a measure of signal strength of a communication signal emitted by the user device and received by the one or more network devices and identifiers of the one or more network devices;
determining a location of the registered used device based on known locations of the one or more network devices and the measure of the signal strength; and
generating a location data record identifying the determined location of the used device.

18. The system of claim 15, wherein the method further comprising:
continuing to monitor the location of the user device using either the first location tracking location technique or the second location tracking technique; and
switching between using first location tracking technique and the second location tracking technique to track the user device as the user device enters and exits communications range of the one or more network devices.

19. The system of claim 15, wherein the one or more network devices comprise location tracking beacons distributed at fixed locations.

20. The system of claim 15, wherein the storing or outputting the location information comprises at least one of:
generating a report identifying locations of the user device at various times;
generating a map of a facility or area identifying the locations of the user device;
generating an alert; and
generating a report identifying one or more second user devices with which the user device has come into proximity of a defined boundary.

* * * * *